United States Patent Office 3,641,164
Patented Feb. 8, 1972

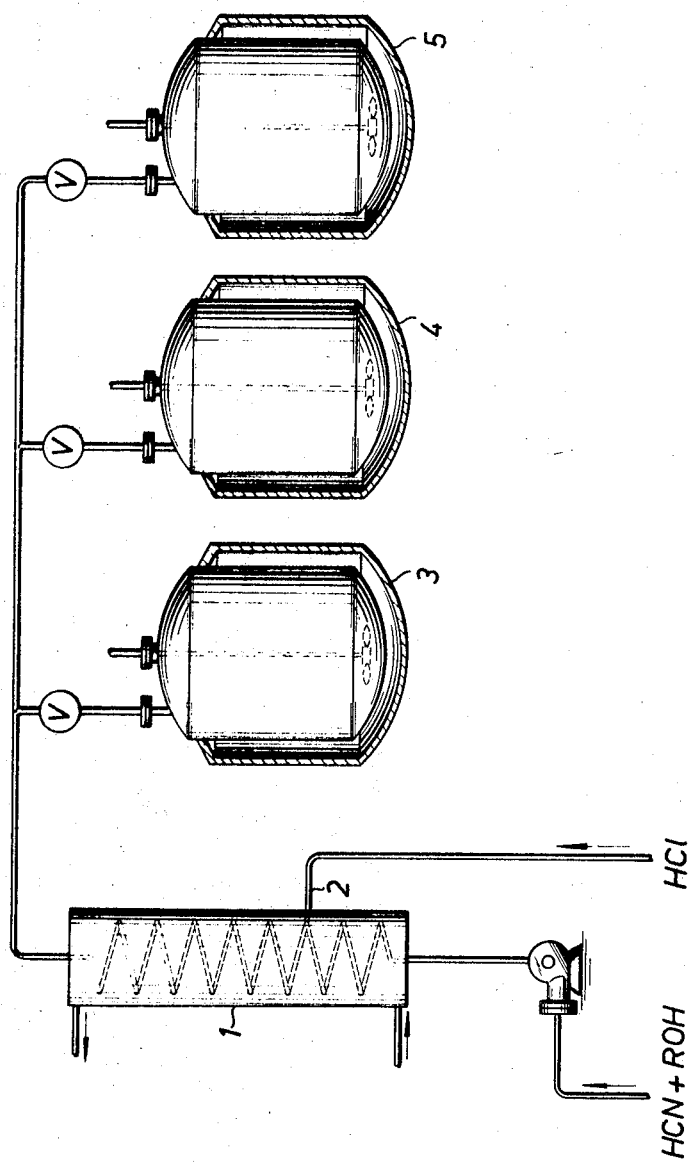

3,641,164
PROCESS FOR THE MANUFACTURE OF
ORTHOFORMIC ACID ALKYLESTERS
Kurt Sennewald, Knapsack, near Cologne, Alexander
Ohorodnik, Liblar, and Hubert Neumaier, Knapsack,
near Cologne, Germany, assignors to Knapsack Aktien-
gesellschaft, Knapsack, near Cologne, Germany
Filed Dec. 2, 1969, Ser. No. 881,536
Claims priority, application Germany, Dec. 3, 1968,
P 18 12 371.2
Int. Cl. C07c 43/32
U.S. Cl. 260—615 A        2 Claims

ABSTRACT OF THE DISCLOSURE

Production of orthoformic acid alkylesters by reacting hydrocyanic acid with a monohydric alcohol and hydrogen chloride at low temperatures to obtain the corresponding formimidoalkylester (formiminoalkylether)-hydrochloride in an anhydrous, inert organic solvent and by reacting the formimidoalkylester-hydrochloride with a further quantity of the alkyl alcohol to obtain the orthoformic acid alkylester. The formation of the formimidoalkylester-hydrochloride is effected in two steps. The first step comprises conveying a substantially equimolar mixture of hydrocyanic acid and an alkyl alcohol having from 1 to 4 carbon atoms through a cooler having a large inner surface and a high heat transmission coefficient, and introducing gaseous hydrogen chloride in a molar ratio of HCl:HCN between 1:1 and 1.1:1 into the mixture travelling through the cooler and cooled down to a temperature between —8° C. and —18° C. The second step comprises pouring the mixture coming from the cooler into cooled, organic solvent, the solvent being used at a rate of between about 1000 bis 1500 cubic centimeters per 1000 grams of theoretically expected formimidoalkylester-hydrochloride and at a temperature of between —20° C. and +8° C. Following crystallization of the formimidoalkylester-hydrochloride, further alkyl alcohol is added, without neutralization of hydrogen chloride in excess, to the said formimidoalkylester-hydrochloride in a quantity corresponding to 80 to 90% of the alcohol quantity theoretically needed, the mixture is maintained at temperatures between 0 and 50° C., crystallized ammonium chloride is isolated, and the orthoformic acid alkylester is purified by subjecting it to distillative treatment.

---

The present invention relates to a process for the manufacture of orthoformic acid alkylesters by reacting hydrocyanic acid with a monohydric alkyl alcohol and hydrogen chloride at low temperatures to obtain the corresponding formimidoalkylester (formiminoalkylether)-hydrochloride, in an anhydrous, inert organic solvent, and by reacting the formimidoalkylester-hydrochloride with a further quantity of alkyl alcohol to obtain the orthoformic acid alkylester. Orthoformic acid alkylesters are known to be highly reactive compounds and therefore they find widespread use in preparative organic chemistry. They would find even more widespread uses if it were possible to carry out conventional manufacturing processes under commercially more attractive conditions and thereby to lower the production costs.

In German Pat. 48,595, it has been reported that the toxicity of hydrocyanic acid has practically arrested the production of orthoformic acid esters from hydrocyanic acid, alcohol and hydrogen chloride. Exclusively responsible for this are, however, the unattractive economic aspects of the processes used heretofore for the production of orthoformic acid esters from hydrocyanic acid, not the toxicity of the acid, which finds considerably more widespread use today in industry, for example in the production of acrylonitrile from acetylene and hydrocyanic acid, or in the production of methacrylonitrile from acetone and hydrocyanic acid. As the feed materials used in carrying out this synthesis have meanwhile become readily accessible commercial products—hydrocyanic acid, for example, is an inexpensive by-product obtained in the production of acrylonitrile by propylene oxidation in contact with ammonia—it is also clear that the limited commercial importance of the above process cannot be said to have been occasioned by the use of costly material. This must be attributed to the costly manner of conducting the reaction. This appears understandable bearing in mind that most of the prior art processes have merely been carried out with the object of improving the degree of utilization of hydrocyanic acid. With the technical facilities available today, however, the use of hydrocyanic acid in the production of orthoformic acid esters incurs costs approaching those incurred by the use of methanol, and even substantially less in those cases, in which hydrocyanic acid is obtained as a by-product.

With these changes in mind, it is clear that the obtainment of good yields of orthoformic acid ester, based on hydrocyanic acid and alkyl alcohol, coupled with the use of fairly small quantities of solvent and coupled further with satisfactory space/time-yields are conditions which must be met so as to advance the art relative to the production of orthoformic acid esters from hydrocyanic acid and an alkyl alcohol in contact with hydrogen chloride, in a suitable solvent. Reliable operation in an uncomplicated apparatus is a further condition to be fulfilled.

Orthoformic acid esters are known to be produced in two steps with the use of a suitable solvent. The first step comprises transforming hydrocyanic acid with the use of a monohydric alcohol and hydrogen chloride in accordance with the following equation:

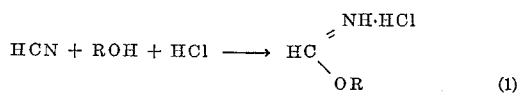

$$HCN + ROH + HCl \longrightarrow HC\overset{NH \cdot HCl}{\underset{OR}{\diagup}} \quad (1)$$

into the formimidoester (formiminoether)-hydrochloride of the alcohol, and the second step comprises reacting the formimidoester-hydrochloride with a further quantity of alcohol and transforming it, without prior isolation, into the corresponding orthoformic acid alkylester, in accordance with the following equation:

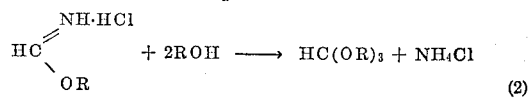

$$HC\overset{NH \cdot HCl}{\underset{OR}{\diagup}} + 2ROH \longrightarrow HC(OR)_3 + NH_4Cl \quad (2)$$

The complex course of this reaction, wherein considerable calorific energy is required to be dissipated, particularly in the first reaction step, for example the solution heat for hydrogen chloride and the high formation- and -crystallization heat of the solid formimidoester-hydrochloride, handicaps reliable operation, especially in the case of relatively large batches. It is known that it is necessary for this reaction to be carried out with particular precaution, for example with the use of a large excess of refrigerating agents. Any failure to maintain the flow of heat under control not only effects loss of material but also considerable risks, which are occasioned by evaporation of hydrocyanic acid.

Attempts have been made in all of the processes used heretofore to avoid these difficulties by carrying out the reaction on small batches at slow speed, using a large excess of solvent. These steps, which affect the economy of the process, are suggested to be used, singly or in combination, in U.S. Pats. 2,527,494 and 3,121,751, and in German Pat. 1,126,854.

It has now unexpectedly been found that the process of the present invention, wherein the first reaction step (cf. Equation 1 above) is subdivided into two partial steps enables the disadvantageous phenomena reported above to be avoided and relatively large quantites of orthoformic acid alkylesters to be produced within substantially shorter reaction periods and with the use of small quantities of solvent. As shown in the accompanying drawing, a mixture of anhydrous hydrocyanic acid with an alkanol having from 1 to 4 carbon atoms, for example methanol, ethanol, propanol, butanol, preferably in a molar ratio of HCN:ROH=1:1, is pumped into a cooler 1, which preferably is a metal coil, that is arranged to be cooled by a refrigerating agent maintained at a temperature between −10° C. and −25° C., preferably −20° C., and circulated around the metal coil. The above molar ratio of HCN:ROH=1:1 is preferred for the reason that the use of a deficiency of ROH fails to ensure an optimum degree of utilization for the hydrocyanic acid, and for the further reason that the use of an excess of ROH in this early stage of the reaction has been found to affect the later yield of orthoformic acid trialkylester and to favor the formation of alkyl chloride and alkyl formate. Near point 2 (this is the point where the mixture has reached the temperature of the refrigerating agent), hydrogen chloride is introduced at a rate sufficient to maintain a molar ratio of HCl:HCN or HCl:ROH of at least 1:1. The use of a minor excess of HCl could not be found to produce disadvantageous effects. The mixing coil, which works continuously, enables a plurality of reactors 3, 4 and 5 to be successively charged within relatively short periods with the formimidoester hydrochloride to undergo further reaction to give the orthoformic acid alkylester.

The mixture coming from cooling coil 1 with a temperature of between −8° C. and −18° C., preferably −12° C., is delivered through cooled conduits to the individual agitator reactors 3, 4 and 5 initially cooled down to −20° C. The reactors have between about 1000 and 1500 cubic centimeters, preferably 1150 cubic centimeters, solvent placed therein, per 1000 grams formimidoester-hydrochloride theoretically obtainable. The useful solvents include more particularly those hydrocarbons or chlorinated hydrocarbons, for example chlorobenzene, o-dichlorobenzene, xylenes, chlorotoluenes, mesitylene, ethylbenzene, tetrachloroethane, cyclohexylchloride, in which ammonium chloride, that is obtained later, is insoluble and have a boiling point higher than that of the orthoformic acid alkylester to be produced. This is advantageous for the finishing treatment. The formation of the formimidoester-hydrochloride is found to be complete within 2 to 5 hours following completion of the supply of material. During that period, the temperature of the reaction mixture is gradually raised to −5° C. up to +8° C., preferably 0° C. Following formation of the formimidoester-hydrochloride, cooled alkyl alcohol is added thereto at a rate corresponding to 80–90%, preferably 83%, of the alcohol quantity theoretically needed in Equation 2 to react the hydrochloride further so as to obtain the orthoformic acid alkylester. The addition of the alcohol in the quantity theoretically needed or even in excess thereover does not produce higher yields of orthoformic acid alkylester. In other words, the alcohol will then be found to have a substantially poorer conversion rate and a rather large alcohol fraction is obtained later during the distillative work-up of the reaction mixture. It is a very costly procedure to purify this alcohol fraction in an attempt to recover and reuse material formed during the reaction, for example hydrocyanic acid and alkyl formate.

Following the alcohol addition, the material is gradually heated, preferably within a period of 2 to 3 hours, to temperatures of between 40 and 50° C., which are maintained for some time, preferably over a 1 hour period. When the material is more rapidly heated, the formimidoester-hydrochloride will be found to be subject to a very violent alcoholysis. The suggestion in German Pat. 1,126,854 that uncompletely reacted hydrogen chloride in excess be neutralized prior to or after the addition of alcohol must be ignored here. Failing this, the orthoformic acid ester will be found to be strongly contaminated with s-triazine as described, inter alia, in U.S. Pat. 3,121,751, for example.

After having been cooled down to +12° C., the solution is filtered to be freed from solid material (predominantly ammonium chloride) which is washed out using a small quantity of solvent; the contaminated filtrates are worked-up by distillative treatment in a packed column. Solvent recovered thereby is reused for further batches.

The present invention relates more particularly to a process for the manufacture of orthoformic acid alkylesters by reacting hydrocyanic acid with a monohydric alcohol and hydrogen chloride at low temperatures to obtain the corresponding formimidoalkylester (formiminoalkylether)-hydrochloride in an anhydrous, inert organic solvent and by reacting the said formimidoalkylester-hydrochloride with a further quantity of the alkyl alcohol to obtain the orthoformic acid alkylester, which comprises effecting the formation of the formimidoalkylester-hydrochloride in two steps, the first step comprising conveying a substantially equimolar mixture of hydrocyanic acid and an alkyl alcohol having from 1 to 4 carbon atoms through a cooler having a large inner surface and a high heat transmission coefficient, and introducing gaseous hydrogen chloride in a molar ratio of HCl:HCN between 1:1 and 1.1:1 into the mixture travelling through the cooler and cooled down to a temperature between −8° C. and −18° C.; and the second step comprising pouring the mixture coming from the cooler into cooled, organic solvent, the solvent being used at a rate of between about 1000 and 1500 cubic centimeters per 1000 grams of theoretically expected formimidoalkylester-hydrochloride and at a temperature of between −20° C. and +8° C.; and finally crystallizing out the formimidoalkylester-hydrochloride and, while omitting neutralization of hydrogen chloride in excess, adding further alkyl alcohol to the said formimidoalkylester-hydrochloride in a quantity corresponding to 80 to 90% of the alcohol quantity theoretically needed; maintaining the mixture of the said formimidoalkylester-hydrochloride and alkyl alcohol at temperatures between 0 and 50° C., isolating crystallized ammonium chloride, and purifying the orthoformic acid alkylester by subjecting it to distillative treatment.

The cooler preferably is a metal coil.

The following example which describes the preparation of orthoformic acid trimethylester serves to further illustrate the process of the present invention.

EXAMPLE

A metal coil made of $V_4A$-steel (stainless steel), 800 centimeters long and 0.8 centimeter wide, cooled with circulating brine (inlet temperature: −20° C.; outlet temperature: −15° C.) was continuously fed with a mixture of anhydrous hydrocyanic acid and anhydrous methanol in a molar ratio of HCN:CH₃OH=1:1 or in a ratio by weight of HCN:CH₃OH=27:32. The mixture was supplied from a reservoir maintained at 0° C., and pumped into the metal coil with the use of a dosing pump delivering the mixture at a rate of 733.7 grams per hour. Hydrogen chloride was introduced at the rate of 454.2 grams/h. near the point where the mixture travelling through the coil was found to have covered a distance corresponding to one third of the path in the coil. The metal coil continuously delivered reaction mixture with a temperature of −12° C., which was introduced into one agitator vessel or successively introduced into a plurality of agitator vessels. As consistent reaction conditions were naturally selected for each of the individual reactors, they will now be described with reference to merely one of the reactors.

1386 grams of a mixture consisting of 392 grams HCN (14.5 mols), 464 grams $CH_3OH$ (14.5 mols) and 530 grams HCl (14.5 mols) were conveyed within 70 minutes through a cooled conduit to a 4-liter agitator reactor cooled from the outside and charged previously with 1800 grams (=1.76 liters) chlorobenzene (16 mols) having a temperature of —20° C. The reactor was ventilated through a reflux condenser and a cooling trap (—78° C.) series-connected to it, for condensation of methyl chloride. During the supply of material, the temperature prevailing inside the reactor was found to increase ($\Delta t = \sim 5$ to 6° C.). After a maximum of 90 minutes, following complete introduction of feed material, the formimidomethylester (formiminomethylether)-hydrochloride was found to commence precipitation, which was accompanied by a further temperature increase ($\Delta t = 8$ to 12° C.). After a further 3 hours—the temperature prevailing in the reactor was gradually raised to 0° C. during that time—there were added 775 grams $CH_3OH$ (24.2 mols) within 15 minutes. Following this, the temperature was increased to 45° C. within 2.5 hours. From 12 to 13° C. on, the reaction mixture was found to always have a temperature some degrees higher than that of the heating bath. More rapid heating effected a very violent reaction and made the solution boil. The whole was maintained at 45° C. for 1 hour, cooled then down to —12° C., and the solution was freed from solid ammonium chloride, which was washed out with 500 grams chlorobenzene.

The combined filtrates were fractionated in a packed column and 1160 grams (=10.95 mols=80.7%, based on HCN transformed or 84.9%, based on $CH_3OH$ used) pure orthoformic acid trimethyl-ester, free from s-triazine, were obtained; $B.P._{750} = 100°$ C.

The chlorobenzene, which was obtained as distillation residue, was directly used for making a further batch. After repeated use, however, it was required to be purified by distilling it.

What is claimed is:
1. In a process for the manufacture of orthoformic acid alkylesters by reacting hydrocyanic acid with an alkanol and hydrogen chloride at low temperatures to obtain the corresponding formimidoalkylester-hydrochloride in an anhydrous, inert organic solvent, and by reacting the said formimidoalkylester-hydrochloride with a further quantity of the alkanol to obtain the orthoformic acid alkylester, the improvement which comprises effecting the formation of the formimidoalkylester-hydrochloride in two steps, the first step comprising conveying a substantially equimolar mixture of hydrocyanic acid and an alkanol having from 1 to 4 carbon atoms through a cooler having a large inner surface and a high heat transmission coefficient, and introducing gaseous hydrogen chloride in a molar ratio of HCl:HCN between 1:1 and 1.1:1 into the mixture travelling through the cooler after it is cooled down to a temperature between —8° C. and —18° C.; and the second step comprising pouring the mixture coming from the cooler into cooled, organic solvent in which ammonium chloride is insoluble, the solvent being used in an amount between about 1000 and 1500 cubic centimeters per 1000 grams of theoretically expected formimidoalkylester-hydrochloride and at a temperature of between —20° C. and +8° C.; and following crystallization of the formimidoalkylester-hydrochloride, adding further alkanol, without neutralization of hydrogen chloride in excess, to the said formimidoalkylester-hydrochloride, in a quantity theoretically needed; maintaining the mixture of the said formimidoalkylester-hydrochloride and alkanol at temperatures between 0 and 50° C., isolating crystallized ammonium chloride, and purifying the orthoformic acid alkylester by subjecting it to distillative treatment.

2. The process as claimed in claim 1, wherein the cooler is a metal coil.

References Cited
UNITED STATES PATENTS

| | | | |
|---|---|---|---|
| 2,527,494 | 10/1950 | Copenhaver | 260—615 A |
| 2,567,927 | 9/1951 | Erickson | 260—615 A |
| 3,121,751 | 2/1964 | Kesslin et al. | 260—615 A |

HOWARD T. MARS, Primary Examiner

PO-1050
(5/69)

UNITED STATES PATENT OFFICE
CERTIFICATE OF CORRECTION

Patent No. 3,641,164     Dated February 8, 1972

Inventor(s) Kurt Sennewald, Alexander Ohorodnik and Hubert Nermaier

It is certified that error appears in the above-identified patent and that said Letters Patent are hereby corrected as shown below:

Col. 6, line 27, "in a quantity theoretically needed" should read -- in a quantity corresponding to 80 to 90% of the alkanol quantity theoretically needed --.

Signed and sealed this 6th day of February 1973.

(SEAL)
Attest:

EDWARD M. FLETCHER, JR.
Attesting Officer

ROBERT GOTTSCHALK
Commissioner of Patents